April 22, 1924.
O. BLOMBERG
VALVE SPRING COMPRESSOR
Filed April 11, 1922  3 Sheets-Sheet 2
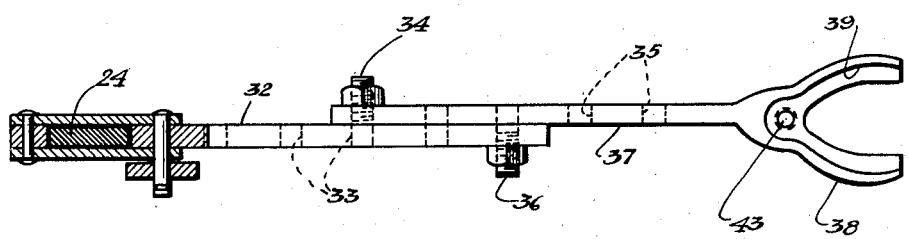
Fig. 5
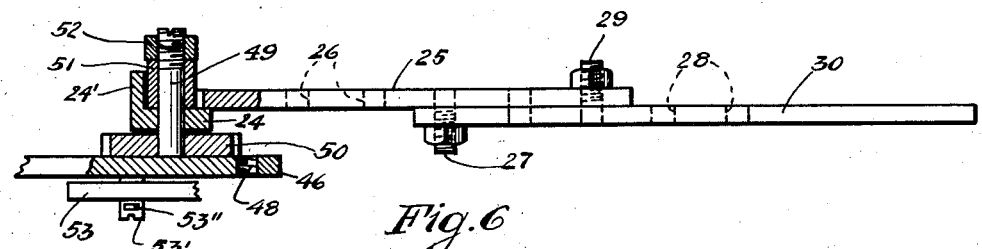
Fig. 6
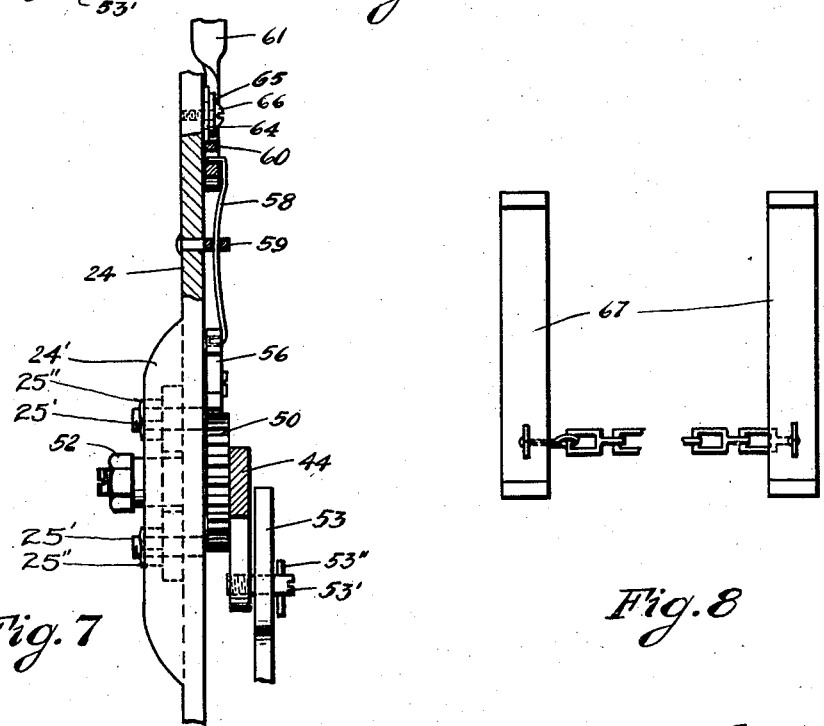
Fig. 7
Fig. 8
Witnesses:
Inventor:
Otto Blomberg
By Joshua H. Potts
His Attorney

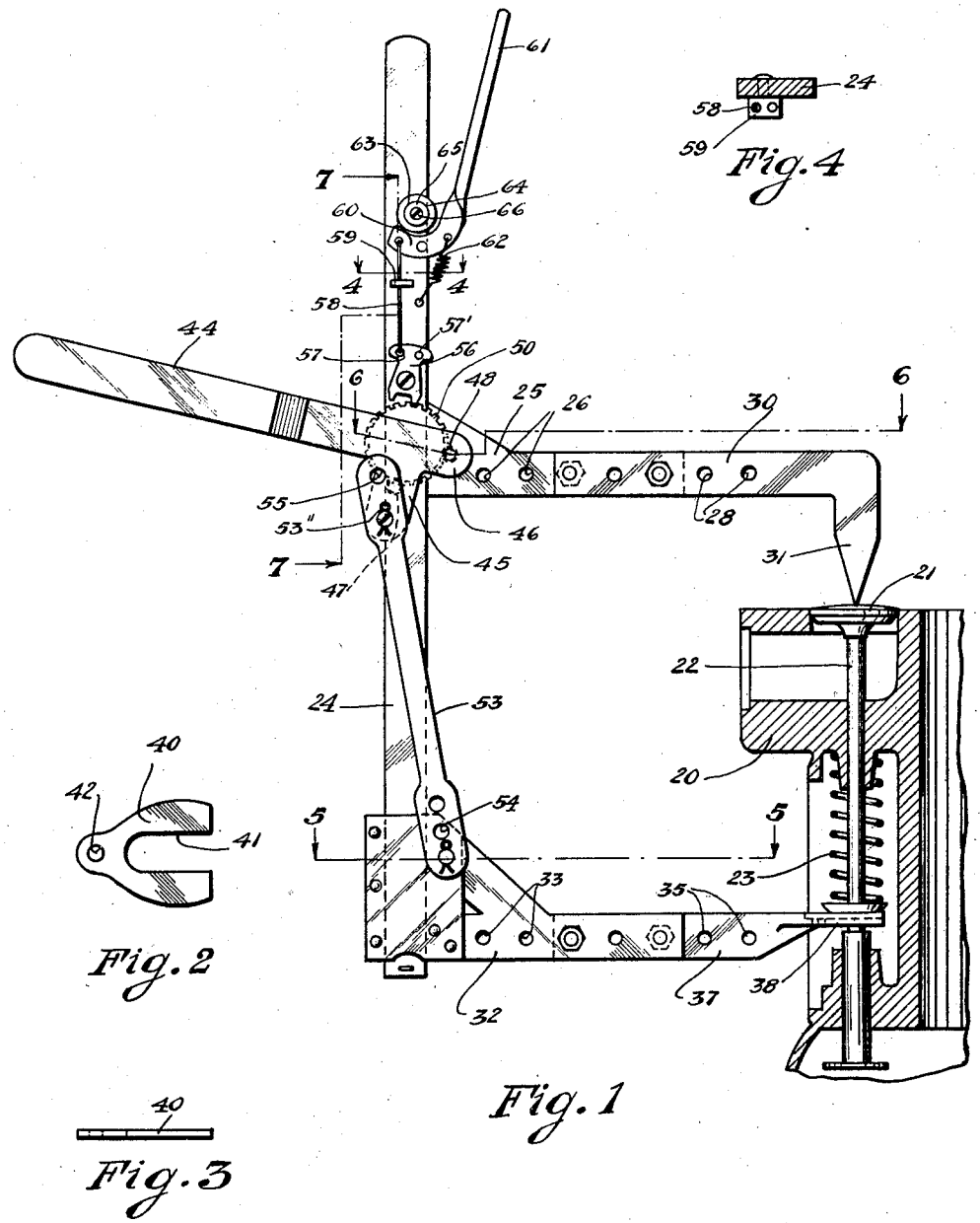

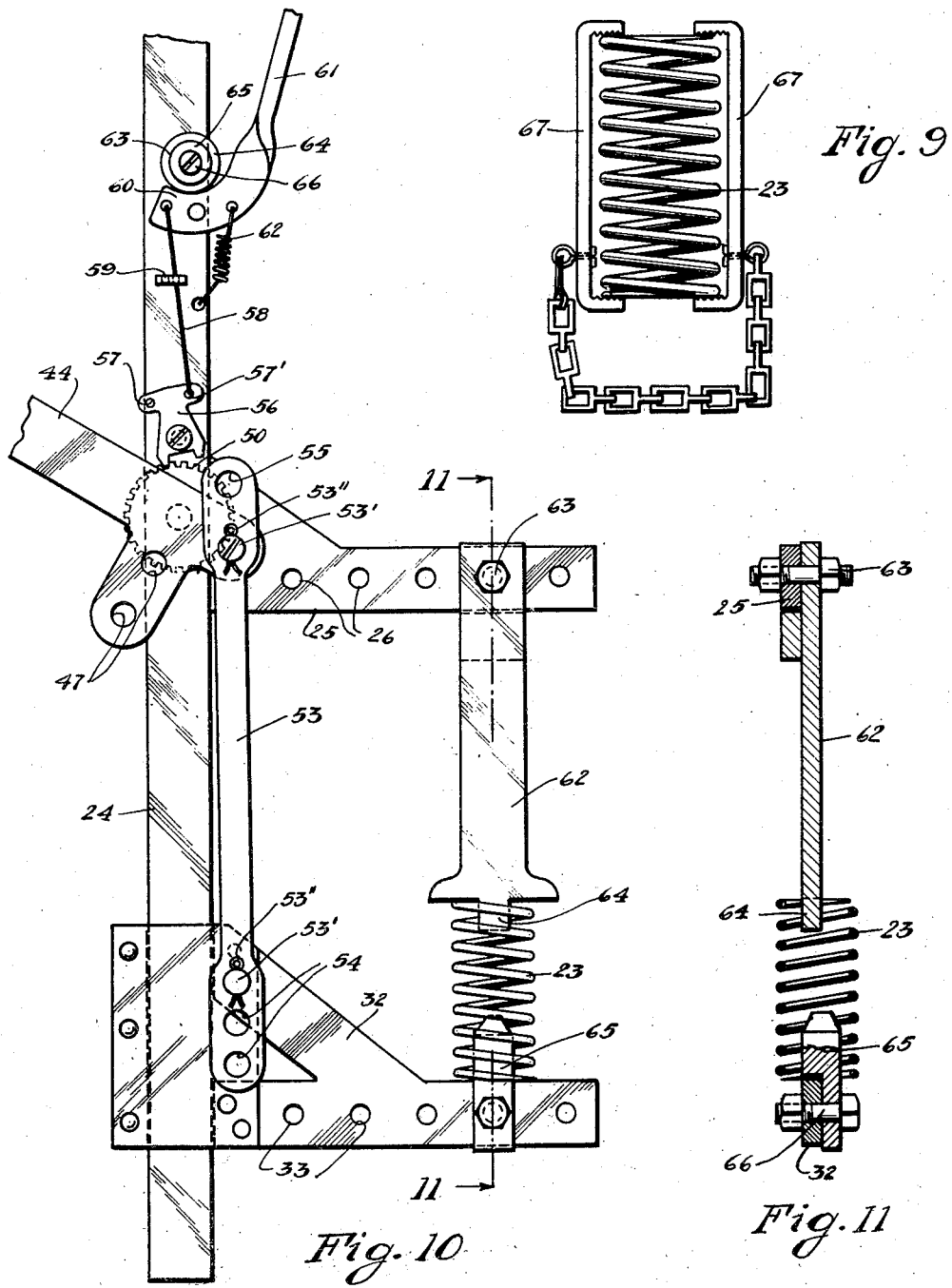

Patented Apr. 22, 1924.

1,491,190

UNITED STATES PATENT OFFICE.

OTTO BLOMBERG, OF HUBBARD WOODS, ILLINOIS.

VALVE-SPRING COMPRESSOR.

Application filed April 11, 1922. Serial No. 551,522.

*To all whom it may concern:*

Be it known that I, OTTO BLOMBERG, a subject of the King of Sweden, a resident of Hubbard Woods, county of Cook, and State of Illinois, have invented certain new and useful Improvements in Valve-Spring Compressors, of which the following is a specification.

This invention relates to valve spring compressors and has for its object the provision of a device of this character which compresses a valve spring and automatically locks same in compressed position.

Another object of the invention is to provide a device which is capable of a straight lift in contradistinction to the undesirable twisting lift commonly present when ordinary devices are employed.

A still further object of the invention is to provide a device having reversible actuating means so that the device may be utilized in different situations.

A still further object of the invention is to provide reversible ratchet mechanism for automatically locking the actuating means to prevent its return to inoperative position.

A still further object of the invention is to provide means whereby the length of stroke of the device may be varied if desired.

Other objects will appear hereinafter.

The invention consists in the combinations and arrangements of parts hereinafter described and claimed.

The invention will be best understood by reference to the accompanying drawings forming a part of this specification, and in which, Fig. 1, is a sectional view of a motor and valve, showing an elevational view of the invention applied thereto, Fig. 2, is a plan view of a reducing washer used in connection with the device, Fig. 3, is an edge view of the washer shown in Fig. 2, Fig. 4, is a section on the line 4—4, Fig. 1, Fig. 5, is a section on the line 5—5, Fig. 1, Fig. 6, is a section on the line 6—6, Fig. 1, Fig. 7, is a section on the line 7—7, Fig. 1.

Fig. 8, is an elevation of locking hooks used in connection with the invention.

Fig. 9, is a view of the locking hooks showing same in operative position,

Fig. 10, is a side elevation of the invention, showing a modified form of attachment applied thereto, and Fig. 11, is a section on line 11—11, Fig. 10.

The invention is particularly adapted for the purpose of compressing springs of motor valves in order to unseat same, and in Fig. 1 of the drawings I have illustrated a portion of a common type of motor, which is indicated by the numeral 20, such motor having a valve 21, a valve stem 22, and a spring 23 disposed about said stem to hold said valve to its seat, all of such construction being in common use. It is well known that it is particularly awkward and inconvenient to compress a strong spring like 23, compression of such spring being necessary to release the valve stem 21.

It is the object of my invention to provide a device which will quickly and conveniently compress valve springs, and automatically hold same in compressed position until the stem of the valve can be released. Such device preferably consists of a standard 24, of any suitable shape and material, preferably reinforced by a flange 24', as shown, such standard preferably being provided, adjacent the flange 24', with a detachable arm 25, which, in the present instance, is mounted perpendicularly to the standard 24, by means of spaced studs 25' upon the standard 24, the studs projecting through related apertures in the adjacent end of the arm 25, there being nuts 25'' threaded on said studs. The arm 25 is preferably provided with a plurality of spaced apertures 26, and a stud 27, such apertures and stud being adapted to be adjustably engaged by apertures 28 and stud 29 on an extension 30, which extension preferably is provided with an inwardly turned pointed end 31, as shown.

Slidably mounted adjacent the lower end of the standard 24 is an arm 32, which arm is also preferably provided with apertures 33 and stud 34 adapted to be adjustably engaged with similar apertures 35 and stud 36 provided on extension 37, as shown, the outer end of the extension 37 having a forked end 38 for disposition about a valve stem. The forked end 38 of the extension 37 preferably has a socket 39 therein, adapted to receive a reducing washer 40, having a smaller slot 41, such washer being employed for the purpose of reducing the size of the aperture in the forked end 38, being retained in the socket by means of a suitable headed screw (not shown) projecting through the aperture 42 therein and being threaded into the socket 43 in the forked end 38. A number of interchangeable washers 40 having slots 41 of different sizes may be provided to suit various types and sizes of valves, and when not in use, for the sake of convenience, may be attached to the tool by any suitable means.

Preferably mounted adjacent the arm 25 is a lever 44, the inner end of which is preferably Y-shaped, having cranks provided by branches 45 and 46, the branch 45 preferably being of greater length than the branch 46, and having two or more apertures 47 therein, while the branch 46 may have a lesser number of apertures 48 therein. Such lever preferably has a stud 49 formed thereon and preferably mounted on the stud 49 and secured thereto, or to the lever 44, by any suitable means, is a ratchet wheel 50. The stud 49 preferably projects through the standard 24, and on the far side of said standard, on the stud preferably is mounted a sleeve 51, and a nut 52, may be threaded on the end of the stud, the sleeve 51 being for the purpose of providing a substantial bearing for the stud 49.

A link 53, which has a series of spaced apertures 54 and 55 in its opposite ends may be secured to either of the branches 45 or 46, and to the movable arm 32, by any suitable means, studs 53' and cotter pins 53'' being shown. It will be noticed that when the link 53 is connected to the branch 45 of the lever 44, upward movement of the lever serves to raise the movable arm 32, while if the link is connected to the branch 46, downward movement of the lever serves to raise the movable arm 32 in the same manner. This feature is important for the reason that in operation it may be convenient to move the lever upwardly, in which event the connection can be changed so that same will move downwardly and still move the arm 32 in the same direction.

Pivotally mounted on the standard 24, adjacent to and cooperating with the ratchet wheel 50 is a double bitted pawl 56, the rear end of said pawl preferably having apertures 57 and 57' therein, one of which is adapted to receive the turned end of a resilient link 58, which preferably passes through a related aperture in a guide member 59 mounted on the standard 24, the outer end of said link being connected to the hooked end 60 of the lever 61, pivotally mounted on the standard 24. A spring 62 is preferably connected to the lever 61 to normally hold same in operative position, and through the link 58, also hold the pawl 56 in operative position. An adjustable stop 63 is preferably mounted in the curve of the lever 61 to govern the clearance of pawl 56, and such stop preferably consists of a washer 64, having a comparatively large aperture therein, adapted to be loosely disposed about a pin 66, a washer 65 having a smaller aperture being mounted on said pin and engaged thereby to hold the washer 64 in its adjusted positions. The pawl 56 in one position normally permits upward movement of the lever 44, and prevents downward movement thereof.

If it is desired to change the direction of movement of the lever 44, as shown in Fig. 1, the link 53 is connected with the branch 46 of said lever, as shown in Fig. 10, and in order to adapt the pawl 56 to the different direction of rotation of the ratchet wheel 50, it is only necessary to disconnect the link 58 from the aperture 57 and from the lever 61; such link is then passed through the inner aperture of the guide member 59 and reengaged with the aperture 57' in the pawl 56 and with the hooked end 60 of the lever 61, as before. Thus it will be seen that no matter in which direction the lever 44 is moved to transmit motion to the arm 32, the pawl 56 adjustably permits inward movement of the arm 32 but automatically prevents its return to inoperative position, until released by the lever 61.

As above stated the extensions 30 and 37 are removable as well as adjustable and any suitable attachments may be secured to the arms 25 and 32. In Fig. 10, I have shown a hanger 62 which may be fastened to the arm 25 with a bolt 63, the inner end of said hanger being reduced so as to form a stud 64. Secured to the arm 32 directly beneath the hanger 62 is a post 65 which may be secured to the arm 32 by bolt 66. With these attachments a spring may be compressed by moving the lever 44, and locked in compressed position until same can be secured by suitable devices, hooks 67 being shown. After the hooks are applied to the spring, same may be removed from the device, and applied to the valve stem.

The device is simple in construction, produces a straight lift, and because of its adjustability may be utilized with any type of valve and motor, or for other similar purposes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the character described comprising compressing members movably connected together; actuating means by an operative stroke of which in one direction moves said members together against resistance; and means permitting a change in the direction of movement of said actuating means so that an operative stroke of same also closes said compressing members against resistance.

2. A device of the character described comprising compressing members movably connected together; actuating means by an operative stroke of which in one direction moves said members together against resistance; means for automatically locking said members against a return movement; means permitting a change in the direction of movement of said actuating means so that an operative stroke of same also closes said members; and means for adapting said locking means to lock said members against movement away from each other when the direction of movement of said actuating means is changed.

3. A device of the character described comprising oppositely disposed compressing members; means for connecting said members together so that same move toward each other; actuating means by a stroke of which in one direction moves said members together; means permitting a change in the direction of movement of said actuating means so that an operative stroke of same also closes said compressing members; and reversible pawl and ratchet mechanism cooperating with said actuating means for automatically locking said compressing members against movement away from each other when the direction of movement of said actuating means is changed.

4. A device of the character described comprising oppositely disposed compressing members; means for connecting said members together so that same move toward each other; actuating means by an operative stroke of which in one direction moves said members together; means for automatically locking said members against a return movement; means permitting a change in the direction of movement of said actuating means so that a stroke of same also closes said members; a ratchet associated with said actuating means; a pawl cooperating with said ratchet; means for releasing said pawl; and a link connecting said releasing means and said pawl, said link being resilient and confined intermediate its ends against lateral movement whereby the same serves to release said pawl, and to yieldably hold the same in engagement with said ratchet.

5. A device of the character described comprising compressing members, one of which is movable; an actuating member having a plurality of cranks adapted to be connected with said movable member, connection to one of said cranks, through an operative stroke of said actuating member in one direction, causing said compressing member to move toward the other, and connection to another of said cranks, through an operative stroke of said actuating member in a different direction also causing said compressing member to move toward the other.

6. A device of the character described comprising compressing members, one of which is movable; an actuating member having a plurality of cranks adapted to be connected with said movable member, connection to one of said cranks through an operative stroke of said actuating member in one direction, causing said movable compressing member to move toward the other, and connection to another of said cranks, through an operative stroke of said actuating member in a different direction also causing said movable compressing member to move toward the other; and reversible pawl and ratchet mechanism cooperating with said actuating member for automatically locking said movable member in closed position when actuated by a stroke of said actuating member in either direction.

7. A device of the character described comprising a movable compressing member, a pivotally mounted lever adjacent to said movable member, connection thereof on one side of the pivot of said lever through an operative stroke of said lever in one direction moving said movable member inwardly and connection of said movable member on the other side of said pivot; through an operative stroke of said lever in the opposite direction, also moving said movable member inwardly.

8. A device of the character described comprising a movable member; a pivotally mounted lever adjacent to said movable member, connection thereof on one side of the pivot of said lever through an operative stroke of said lever in one direction moving said movable member inwardly and connection of said movable member on the other side of said pivot, through an operative stroke of said lever in the opposite direction, also moving said movable member inwardly; a ratchet wheel connected to said lever; and a reversible pawl for automatically locking said ratchet when moved in either direction.

9. A device of the character described comprising compressing members movably connected together; actuating means for moving said compressing members together against resistance; a ratchet wheel connected to said actuating means; and a reversible pawl, having means to release same, such means at the same time being yieldable to permit operation of said pawl.

10. A device of the character described comprising compressing members movably connected together; actuating means for moving said compressing members together against resistance; a ratchet wheel connected to said actuating means; a pawl co-operating with said ratchet; a lever for releasing said pawl; a link connecting said lever and said pawl, said link being resilient and confined intermediate its ends against lateral movement whereby same serves to release said pawl and to yieldably hold same in engagement with said ratchet.

11. A device of the character described comprising compressing members movably connected together; actuating means for moving said compressing members together against resistance; a ratchet wheel connected to said actuating means; a reversible pawl co-operating with said ratchet; a lever for releasing said reversible pawl; a link connecting said lever and said reversible pawl, said link being resilient and confined intermediate its ends against lateral movement, whereby same serves to release said reversible pawl and to yieldably hold same in engagement with said ratchet.

12. A device of the character described comprising oppositely disposed compressing members; means for connecting said members together so that same move directly toward each other; actuating means by a stroke of which in one direction moves said members together; means permitting a change in the direction of movement of said actuating means so that an operative stroke of same also closes said compressing members; ratchet mechanism connected to said actuating means; a pawl co-operating with said ratchet; a lever for releasing said pawl, and a link connecting said lever and said pawl, said link being resilient and confined against lateral movement whereby same serves to release said pawl and to yieldably hold same in engagement with said ratchet mechanism.

13. A device of the character described comprising compressing members movably connected together; actuating means an operative stroke of which in one direction moves said members together; means permitting a change in the direction of movement of said actuating means so that an operative stroke of the same also closes said compressing members; and adjustable means for varying the effective stroke of said actuating means.

14. A device of the character described comprising compressing members, one of which is movable; an actuating member having a plurality of cranks adapted to be connected with said movable member at varying distances, connection to one of said cranks, through an operative stroke of said actuating member in one direction, causing said compressing member to move toward the other, and connection to another of said cranks, through an operative stroke of said actuating member in a different direction also causing said compressing member to move toward the other.

In testimony whereof I have signed my name to this specification in the presence of two subscribing witnesses.

OTTO BLOMBERG.

Witnesses:
CLARENCE E. THREEDY,
FREDA C. APPLETON.